Patented Nov. 17, 1942

2,302,632

UNITED STATES PATENT OFFICE 2,302,632

POLYMERIZATION OF ROSIN AND ROSIN ESTERS

Irvin W. Humphrey, Wilmington, Del., assignor to Hercules Powder Company, Wilmington, Del., a corporation of Delaware No Drawing. Application June 14, 1940, Serial No. 340,470

22 Claims. (Cl. 260—97)

The present invention relates to a process for polymerizing rosin and rosin esters, and more particularly to such a process wherein an improved polymerizing agent is employed.

It has heretofore been proposed to polymerize rosin and rosin esters with various polymerizing agents, such as sulfuric acid, boron trifluoride, phosphoric acid, amphoteric metallic chlorides, and the like. The prior methods of polymerizing rosin and rosin esters are disadvantageous in various respects. Thus, sulfuric acid as the polymerizing agent frequently causes objectionable charring or discoloration of the material, boron trifluoride as the polymerizing agent is too expensive and otherwise objectionable, phosphoric acid is not sufficiently active, and in general, with prior polymerizing agents, the polymerization does not proceed with the desired effectiveness and smoothness and is otherwise unsatisfactory.

The principal object of the present invention is to provide an improved process for the polymerization of rosin, rosin esters and mixtures thereof.

Another object is to provide such a process wherein a catalyst is employed which is more efficient and more effective than catalysts heretofore proposed for this reaction.

Another object is to devise a process for the simultaneous polymerization and refining of rosin and rosin esters.

Other objects of the present invention will more fully hereinafter appear as the description thereof proceeds.

I have discovered that hydrogen fluoride is a highly efficient, very effective, and very satisfactory catalyst for the polymerization of rosin and rosin esters.

I have further discovered that the use of hydrogen fluoride as a catalyst in the presence of water is especially advantageous in that it is capable of effecting a refining action simultaneously with the polymerizing reaction, whereby the color of the product is improved materially over the color of the original material. This simultaneous refining and polymerization may be brought about by the employment of the hydrogen fluoride in the form of aqueous hydrofluoric acid.

In accordance with the present invention, the rosin or rosin ester is treated preferably while in solution in a volatile organic solvent, with hydrogen fluoride. Preferably, I use hydrogen fluoride in the form of aqueous hydrofluoric acid of a concentration varying from about 40% by weight up to about 97% by weight, and preferably from about 50% by weight up to about 97% by weight.

As the solvent for the rosin or rosin ester, I prefer to use an organic solvent which is volatile and which is substantially inert with respect to the hydrogen fluoride employed as the catalyzing agent. Examples of such solvents are V. M. & P. naphtha, gasoline, or other light petroleum fractions, benzene, toluene, xylene, chlorinated hydrocarbon solvents, such as, carbon tetrachloride, ethylene dichloride, chlorinated benzene, chlorinated toluene, trichlorethylene, etc. The concentration of the raw material in the solution may vary within wide limits, for example, between about 10 and about 75% of the material on the weight of the solution. The employment of solution having a concentration of from 15 to 30% by weight of the material to be polymerized is particularly advantageous. While the use of high concentration of materials to be polymerized in the solution favors the achievement of the highest melting point in the shortest reaction time, such high concentrations may often favor increased color in the product which is sometimes disadvantageous.

Instead of employing a solvent or diluent which is liquid at ordinary temperatures, I may employ a solvent or diluent which is so highly volatile as to be gaseous at ordinary temperatures and pressures, such as for example, n-butane, isobutane, propane, etc. When using such normally gaseous solvents, I find it preferable to carry out the reaction under super-atmospheric pressure.

I prefer to employ the hydrogen fluoride in the form of aqueous hydrofluoric acid, preferably having a concentration of at least about 40% by weight of hydrogen fluoride. The concentration of hydrogen fluoride in the acid may vary from about 40% by weight up to about 97% by weight. Solutions of a concentration above about 62% are generally prepared by dissolving liquid anhydrous hydrofluoric acid in water to the desired concentration. I find that the more concentrated the hydrofluoric acid, the more rapid and more effective the polymerization of the rosin or rosin esters. Accordingly, I prefer to use the higher concentrations such as from about 75% upwardly.

The preferred procedure in accordance with the present invention comprises dissolving the rosin or rosin ester in the solvent and treating the solution with aqueous hydrofluoric acid under polymerizing conditions for a period of time sufficient to bring about the desired extent of polymerization. Following this treatment, the reaction mixture is washed with water in order to remove the catalyst therefrom, after which the residual solution containing the polymerized product is evaporated to recover the polymerized rosin or rosin ester.

The temperature may be between below 0° C. and about 200° C. but is preferably maintained between about 20° C. and about 85° C. during the treatment. At temperatures much below 0° C., the reaction is very slow and the time required is inordinately large. At temperatures above 125° C., it is necessary to be careful to have a short reaction period in order to prevent the decomposition of the rosin or rosin ester. If the acid and acid sludge layer which may often be present, particularly when a 48 to 75% concentration of hydrofluoric in water is used, is separated from the solution layer prior to washing the solution, an improvement in color may be effected. If further improvement in color is desired, the resulting polymerized rosin or rosin ester may be refined with selective solvents, such as furfural, phenol, ethylene chlorohydrin, etc., or with absorbents, such as activated clay, activated carbon, fuller's earth, etc.

The amount of catalyst employed will vary depending upon the temperature at which the treatment is carried out. In general, the amount may vary between limits which give from about 1% by weight to about 100% by weight of anhydrous hydrofluoric on the weight of rosin or rosin ester. Preferably an amount lying within the range of from about 5% by weight to about 50% by weight is employed. At low temperatures, say up to 50° C., the amount of catalyst based upon the raw material to be polymerized which gives the maximum increase in melting point is about 5% to about 50% by weight. As the temperature is increased, smaller amounts of catalyst produce satisfactory results. However, the amount of catalyst should not be reduced to too low a figure because the time required to obtain the desired degree of polymerization when extremely low amounts of catalyst are employed is excessively long. In general the more concentrated the aqueous hydrofluoric acid, the more effective its polymerizing action, and the lower the necessary amount of catalyst.

The reaction period may vary from that required to effect intimate intermixture of the reactants to 24 hours or more. The length of time for the polymerization depends upon the concentration of the aqueous hydrofluoric acid solution present, decreasing with increased concentration; upon the temperature employed, decreasing with increased temperature; upon the pressure employed; upon the concentration of rosin or rosin ester in the initial solution; upon the relative proportions of the several reactions; upon the extent of polymerization (as indicated by increase of melting point) desired; as well as upon other factors. Preferably the time will vary from about 0.1 to about 10 hours, since such a time will usually be adequate to produce the desired degree of polymerization and refining without producing objectionable degradation or discoloration.

The use of aqueous hydrofluoric acid as the polymerizing agent is particularly advantageous since it gives rise to the afore-mentioned refining action whereby the product is improved in color as compared with the original material. As previously mentioned, in order for refining to be effective, acid and acid sludge must be separated from the reaction mixture prior to water washing. A dark-colored polymerized rosin may be recovered from this sludge by treating it with water, extracting the polymerized rosin with a suitable or water-immiscible inert solvent, washing the extract with water, and evaporating the solvent. In many cases, the dark-colored polymerized rosin may be extracted from the acid sludge directly with a suitable solvent.

The use of gasoline as a solvent is particularly favorable because, during the reaction, there is formed a precipitate which, when filtered off at the end of the reaction period tends to remove color bodies and thus gives a lighter colored product, so that additional refining as well as polymerization takes place.

The polymerizing treatment may be carried out either at atmospheric pressure or at super-atmospheric pressures. The pressure may vary from 1 atmosphere to 100 atmospheres. When operating under pressure, it is preferred to use a suitable pressure-resisting vessel such as an autoclave or a bomb. The use of super-atmospheric pressures is advantageous because it speeds up the reaction, maintains the hydrogen fluoride in condensed form (either liquid or dissolved) and permits the use of higher temperatures. In addition, when employing a diluent which is gaseous at ordinary temperatures and pressures, the diluent is maintained in liquid form during the treatment.

Following the treatment with the polymerizing agent, the solution is treated in any desired manner to remove the catalyst therefrom, as for example, by washing with cold or hot water, or, where prevention of formation of emulsions is desired, with a hot or cold aqueous solution of an electrolyte, such as sodium chloride, sodium sulphate, etc., or with a dilute aqueous solution of an alkali, such as ammonium hydroxide, sodium carbonate, ammonium carbonate, etc., or with a dilute aqueous solution of an organic base, such as triethanolamine, followed with a final wash with pure water. The washed solution is then treated so as to recover the polymerized product therefrom as by evaporation of the solvent. The polymerized product may be treated in the solution or subsequently to refine it and reduce its color, as for example by treating the solution with nascent hydrogen.

The product may be heat treated to improve the color; for example, by heating it to a temperature within the range of from about 250° C. to about 325° C. and preferably from about 250° C. to about 300° C. for a period from about .01 to about 2 hours. Heat treating is preferably conducted in an inert atmosphere of carbon dioxide, nitrogen, or the like.

The polymerized product, whether previously subjected to heat treatment in the manner just outlined or not, or prior to such heat treatment, may be subjected to partial distillation under reduced pressure, for example at about 15 m.m. absolute of mercury, to remove approximately 5–60% of oils and non-polymerized rosin, etc., giving a residue of still higher melting point.

Various types of rosin may be treated in accordance with the process of the present invention, such as wood rosin, gum rosin, rosin of various degrees of purification, equivalents of rosin, such as abietic acid, pimaric acid, sapinic acid, etc. The rosin treated may have been previously refined or purified by any of the known refining methods.

Various types of rosin esters may be treated by the present invention, such as for example, ester gum, or other polyhydric alcohol esters of rosin or abietic acid, such as glycol esters, mannitol esters, sorbitol esters, pentaerythritol esters, erythritol esters, etc. Monohydric alcohol esters of rosin or abietic acid may be treated, such as methyl, ethyl, propyl, butyl, oleyl, stearyl, abietinyl, abietates, etc. Aromatic monohydric esters, such as, phenyl abietate, naphthyl abietate, benzyl abietate, etc., may be treated by the present invention. Instead of employing a single rosin ester, mixtures thereof may be treated.

Instead of treating either rosin or rosin esters, mixtures of rosin and rosin esters may be treated in accordance with the present process.

Instead of employing an intermittent process, a continuous process may be used. For example, a solution of rosin or rosin ester in a solvent may be continuously introduced to a polymerizing zone, wherein it continuously comes into contact with aqueous hydrofluoric acid which is continuously introduced, after which the reaction mixture is continuously withdrawn from the polymerizing zone and treated to recover the polymer and hydrofluoric acid therefrom. The process may be made continuous in other modes. Likewise, instead of employing the rosin or rosin ester in solution, it may, under certain circumstances, be employed in molten form, as for example, by treating the rosin or rosin ester at an elevated temperature in an autoclave with aqueous hydrofluoric acid, with continuous agitation of the mixture. Preferably, the mixture of molten rosin or rosin ester and aqueous hydrofluoric acid is subjected to an elevated pressure in order to accelerate the reaction and maintain the hydrofluoric acid in dissolved or liquid form.

In general, the product of the process of the present invention is characterized by an increase in melting point of from about 5 to about 50° C. or more, as determined by the Hercules drop method which is a standard method in the art. This increase in melting point results from the polymerization reaction.

Instead of using a previously prepared aqueous solution of hydrofluoric acid, the same effect may be obtained by introducing anhydrous gaseous or liquid hydrofluoric acid and separately admixing water in the desired amount with the rosin or rosin ester to be polymerized or the solution thereof. This produces an aqueous solution of hydrofluoric acid of the desired concentration. It will be understood that the hydrofluoric acid may also dissolve to some extent in the organic solvent or diluent present, or in the rosin or rosin ester, the distribution of the hydrofluoric acid depending upon conditions.

Alternatively, the hydrofluoric acid may be made in situ by contacting the solution of the rosin or rosin ester with a substance such as sodium or calcium fluoride from which hydrogen fluoride is liberated by treating the mixture with an acid such as sulfuric acid.

The reaction can desirably be conducted in an inert atmosphere such as nitrogen or carbon dioxide, using reagents which are substantially free from air or oxygen whereby discoloration of the polymer is held at a minimum.

Preferably, the reaction is carried out in equipment of corrosion-resisting character, such as chrome steel, stainless steel equipment, etc. Copper equipment may be employed, the hydrofluoric acid forming a very insoluble protective film of copper fluoride thereon which prevents further corrosion.

Below I give several examples showing typical methods of carrying out the process of the present invention.

*Example 1*

To 250 g. of a 13.2% solution of FF wood rosin in V. M. & P. naphtha at room temperature was added 23 cc. of 50% hydrofluoric acid (40.3% HF on the weight of rosin) the mixture being agitated vigorously and maintained at room temperature for about 1 minute whereupon layer formation was allowed to take place, the supernatent solution of polymerized rosin being separated from the lower layer of aqueous acid. A trace of dark precipitate remained in the acid layer. The solution of polymer in the naphtha was washed with water after which the solvent was removed by reduced pressure distillation. The product had an acid number of 157, a melting point of 84.5° C., and a color of G+. The original untreated rosin had an acid number of 158 and a melting point of 79° C.

*Example 2*

To 75 g. of a 30.7% solution of I wood rosin in benzene in a lead flask provided with a lead reflux condenser, there was added gradually with stirring 10 g. of 50% aqueous hydrofluoric acid (21.75% HF on the weight of rosin). The mixture was heated with intermittent agitation for 6 hours on the steam bath at the reflux temperature (85° C.). The mixture was cooled, washed with water to remove hydrofluoric acid, and the solution of polymer in benzene was evaporated under reduced pressure to remove the solvent and to recover the polymerized rosin. The product had an acid number of 166, a melting point of 85.5° C., and a color of I. The original material had an acid number of 163 and a melting point of 81° C.

*Example 3*

To 300 g. of a 15% solution of FF wood rosin in gasoline there was added gradually with vigorous agitation 25 cc. of aqueous 50% hydrofluoric acid (34.1% HF on the weight of rosin). The addition caused some sludge precipitation. The treatment took place at room temperature (20° C.) and the addition consumed about 1 minute. As soon as the addition had been completed and thorough agitation had been effected, the sludge was removed, and the gasoline solution was washed with water to remove the hydrofluoric acid, whereupon the residual solution was evaporated to give a 90% yield of G+ rosin. The melting point of the product was 84° C. whereas the melting point of the original material was 79° C.

*Example 4*

To a solution of 150 g. K wood rosin in 150 g. gasoline (which had been previously freed from olefins by washing with 95% $H_2SO_4$) was added 50 g. of hydrogen fluoride containing 25% by weight of water, with agitation and cooling at 15–18° C. during 20 minutes. The reaction mixture was agitated for a period of about 24 hours at 25° C., in a stainless steel reaction vessel which had been closed off to prevent loss of volatile HF. The mixture was then water washed for removal of catalyst, filtered, and the solvent evaporated in vacuo. The product had the following properties:

|  | Original | Treated |
|---|---|---|
| Acid number | 163 | 149 |
| Drop melting point ° C. | 81 | 115 |
| Color | K | G |
| $(SCN)_2$ value | 90 | 70 |

*Example 5*

This example demonstrates the operation of this invention, using a closed system under pressure. To a solution of 150 g. N grade gum rosin in 150 g. gasoline (which had been previously freed from olefins by washing with 95% $H_2SO_4$)

in a stainless steel autoclave, was added 5 g. of hydrogen fluoride containing 25% by weight of water. The autoclave was closed and agitated vigorously for 7 hours at 100° C. After cooling and opening, the reaction mixture was water washed, and the solvent evaporated in vacuo. The product had the following properties:

|  | Original | Treated |
|---|---|---|
| Acid number | 163 | 150 |
| Drop melting point °C | 83 | 105 |
| Color | N | H |
| (SCN)$_2$ value | 90 | 80 |

*Example 6*

50 g. hydrogen fluoride containing 25% water was added slowly to a solution of 150 g. ester gum in 200 g. gasoline during 0.5 hour with agitation and cooling at 15–20° C. A stainless steel reaction vessel was used which was closed after adding the hydrogen fluoride. The gasoline used as solvent had been previously washed with 95% H$_2$SO$_4$ in order to remove olefins. The reaction mixture was agitated for a period of 18 hours at 25° C., then water washed and the solution filtered. Solvent was evaporated in vacuo. The product exhibited the following characteristics:

|  | Original | Treated |
|---|---|---|
| Acid number | 8 | 12 |
| Color | N | H |
| Drop melting point °C | 89 | 118 |
| (SCN)$_2$ | 85 | 65 |

*Example 7*

Example 6 was duplicated but using 50 g. of hydrogen fluoride containing 10% water. The product had the following characteristics:

|  | Original | Treated |
|---|---|---|
| Acid number | 8 | 10 |
| Color | N | H |
| Drop melting point °C | 89 | 120 |
| (SCN)$_2$ value | 85 | 60 |

From the foregoing, it will be seen that the use of aqueous hydrofluoric acid is particularly advantageous in the polymerization of rosin and rosin esters. This polymerizing catalyst is fully as effective as sulfuric acid and is free from the disadvantages of sulfuric acid, such as possible charring, excessively violent reaction, etc. Aqueous hydrofluoric acid is also superior to boron trifluoride as a catalyst since it is more easily handled, is more effective as a polymerizing agent and is considerably less expensive. The presence of water in the reaction mixture is advantageous because it effects a refining action which takes place simultaneously with polymerization. Numerous other advantages of the process of the present invention will be apparent to those skilled in the art.

In the copending application of A. L. Rummelsburg, Serial No. 340,479, filed of even date herewith, there is described and claimed the polymerization of rosin or rosin esters with substantially anhydrous hydrofluoric acid.

In certain of the claims the term "aqueous hydrofluoric acid" is intended to denote hydrofluoric acid containing at least 3% by weight of water.

It will be understood that the details and examples hereinbefore set forth are illustrative only and that the invention as broadly described and claimed is in no way limited thereby.

What I claim and desire to protect by Letters Patent is:

1. The process of polymerizing a rosin which comprises treating said rosin at a temperature of from about 0° C. to about 200° C. with hydrofluoric acid for a period of time sufficient to bring about substantial polymerization of the rosin.

2. The process of polymerizing a rosin which comprises treating said rosin at a temperature of from about 0° C. to about 200° C. with aqueous hydrofluoric acid for a period of time sufficient to bring about substantial polymerization of the rosin.

3. A process of polymerizing a material selected from the group consisting of rosin and rosin esters which comprises treating said material with hydrofluoric acid at a temperature of from about 0° C. to about 200° C. for a period of time sufficient to bring about substantial polymerization of said material.

4. A process of polymerizing a material selected from the group consisting of rosin and rosin esters which comprises treating said material with aqueous hydrofluoric acid having a concentration of at least 40% hydrogen fluoride by weight at a temperature of from about 0° C. to about 200° C. under polymerizing conditions for a period of time sufficient to bring about substantial polymerization.

5. A process of polymerizing a material selected from the group consisting of rosin and rosin esters which comprises treating said material in solution in an inert organic solvent, the concentration of said material in said solution varying within the range of from about 10 to about 75% by weight, with aqueous hydrofluoric acid at a temperature of from about 0° C. to about 200° C. for a period of time sufficient to bring about substantial polymerization of said material.

6. A process of polymerizing a material selected from the group consisting of rosin and rosin esters which comprises treating said material with aqueous hydrofluoric acid at a temperature of from about 0° C. to about 200° C. under polymerizing conditions for a period of time sufficient to bring about substantial polymerization of said material.

7. The process of polymerizing a material selected from the group consisting of rosin and rosin esters which comprises treating said material with hydrofluoric acid at a temperature of from about 0° C. to about 125° C. for a period of time sufficient to bring about substantial polymerization of said material.

8. The process of polymerizing a material selected from the group consisting of rosin and rosin esters which comprises treating said material with hydrofluoric acid at a temperature of from about 20° C. to about 85° C. for a period of time sufficient to bring about substantial polymerization of said material.

9. The process of polymerizing a material selected from the group consisting of rosin and rosin esters which comprises treating said material in solution in an inert volatile organic solvent with aqueous hydrofluoric acid at a temperature varying from about 20° C. to the refluxing temperature of the mixture for a period of time sufficient to bring about substantial polymerization of said material.

10. The process of polymerizing a material selected from the group consisting of rosin and rosin esters which comprises treating said material with hydrofluoric acid in an amount such as to give from about 1% to about 100% of anhydrous HF on the weight of said material at a temperature of from about 0° C. to about 200° C. for a period of time sufficient to bring about substantial polymerization of said material.

11. The process of polymerizing a material selected from the group consisting of rosin and rosin esters which comprises treating said material with aqueous hydrofluoric acid having a concentration of at least 40% hydrogen fluoride by weight, in an amount such that actual hydrogen fluoride is present in the mixture in an amount lying within the range of from about 5% to about 50% of anhydrous HF on the weight of the material at a temperature of from about 0° C. to about 200° C. or a period of time sufficient to bring about substantial polymerization of said material.

12. The process of polymerizing a material selected from the group consisting of rosin and rosin esters which comprises treating said material in solution in an inert volatile organic solvent, the concentration of said material in said solution being from about 10 to about 75% by weight, with hydrofluoric acid at a temperature of from about 0° C. to about 125° C. for a period of time varying from 1 minute to 24 hours sufficient to bring about substantial polymerization of said material.

13. The process of polymerizing a material selected from the group consisting of rosin and rosin esters which comprises treating said material in solution in an inert volatile organic solvent, the concentration of said material in said solution being from about 10 to about 75% by weight, at a temperature of from about 0° C. to about 125° C. with aqueous hydrofluoric acid for a period of time varying from about 0.1 to about 24 hours sufficient to bring about substantial polymerization of said material, washing the mixture with water to remove the hydrofluoric acid therefrom, and evaporating the solvent from the washed solution to recover the polymerized material.

14. The process of polymerizing a material selected from the group consisting of rosin and rosin esters which comprises treating said material with hydrofluoric acid at a temperature of from about 0° C. to about 200° C. for a period of time sufficient to bring about substantial polymerization of said material, and removing hydrofluoric acid from the reaction mixture.

15. The process of treating a material selected from the group consisting of rosin and rosin esters which comprises polymerizing said material in solution in an inert volatile organic solvent with aqueous hydrofluoric acid at a temperature of from about 0° C. to about 200° C., separating the aqueous acid layer and the acid sludge from the solution of polymerized material in said solvent, and recovering said polymerized material from said solution.

16. The process of treating a material selected from the group consisting of rosin and rosin esters which comprises polymerizing said material with hydrofluoric acid at a temperature of from about 0° C. to about 200° C., and washing the reaction mixture with an aqueous medium to remove hydrofluoric acid therefrom.

17. The process of treating a material selected from the group consisting of rosin and rosin esters which comprises polymerizing said material with hydrofluoric acid at a temperature of from about 0° C. to about 200° C., and washing the reaction mixture with an aqueous solution of an electrolyte to remove hydrofluoric acid therefrom.

18. The process of continuously polymerizing a material selected from the group consisting of rosin and rosin esters which comprises continuously introducing a solution thereof in an inert volatile organic solvent and hydrofluoric acid to a polymerizing zone, maintaining the temperature during the polymerization at from about 0° C. to about 200° C., continuously withdrawing the reaction mixture from said zone, and treating the withdrawal to recover the polymerized material therefrom.

19. A process of polymerizing rosin which comprises treating it with hydrofluoric acid at a temperature of from about 0° C. to about 200° C. for a period of time sufficient to bring about substantial polymerization thereof.

20. A process of polymerizing rosin which comprises treating it with aqueous hydrofluoric acid at a temperature of from about 0° C. to about 200° C. for a period of time sufficient to bring about substantial polymerization thereof.

21. A process of polymerizing rosin which comprises treating a solution thereof in an inert volatile organic solvent with aqueous hydrofluoric acid at a temperature of from about 0° C. to about 200° C. for a period of time sufficient to bring about substantial polymerization thereof.

22. A process of polymerizing rosin which comprises treating it with aqueous hydrofluoric acid having a concentration of from about 40% hydrogen fluoride by weight to about 97% hydrogen fluoride by weight at a temperature of from about 0° C. to about 200° C. for a period of time sufficient to bring about substantial polymerization thereof.

IRVIN W. HUMPHREY.

CERTIFICATE OF CORRECTION.

Patent No. 2,302,632.  November 17, 1942.

IRVIN W. HUMPHREY.

It is hereby certified that error appears in the printed specification of the above numbered patent requiring correction as follows: Page 2, second column, line 43, for ".01" read --0.1--; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.